May 14, 1963   V. C. BROCKMANN   3,089,462
PACKAGE AND FEEDER FOR BIRD FEED
Filed Nov. 14, 1961   3 Sheets-Sheet 1
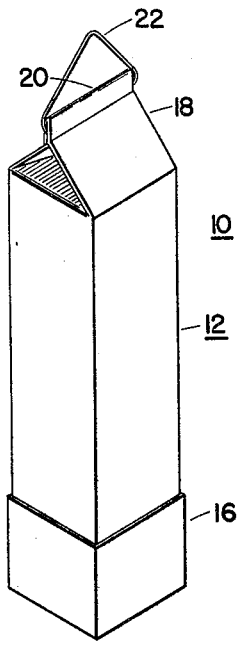
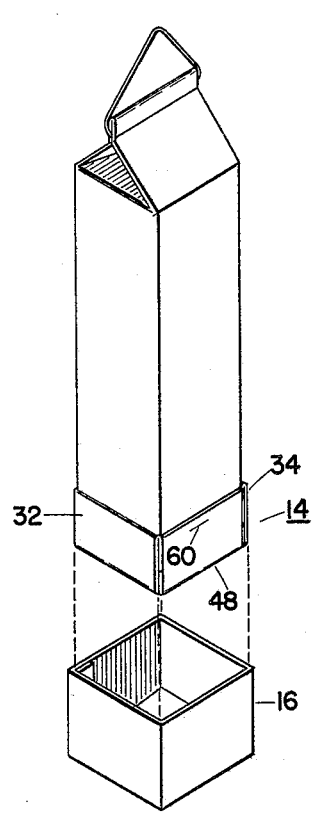
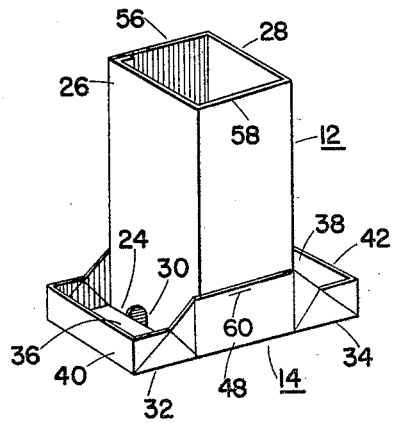
*INVENTOR.*
VIRGIL C. BROCKMANN
BY Wood, Gust & Irish
ATTORNEYS

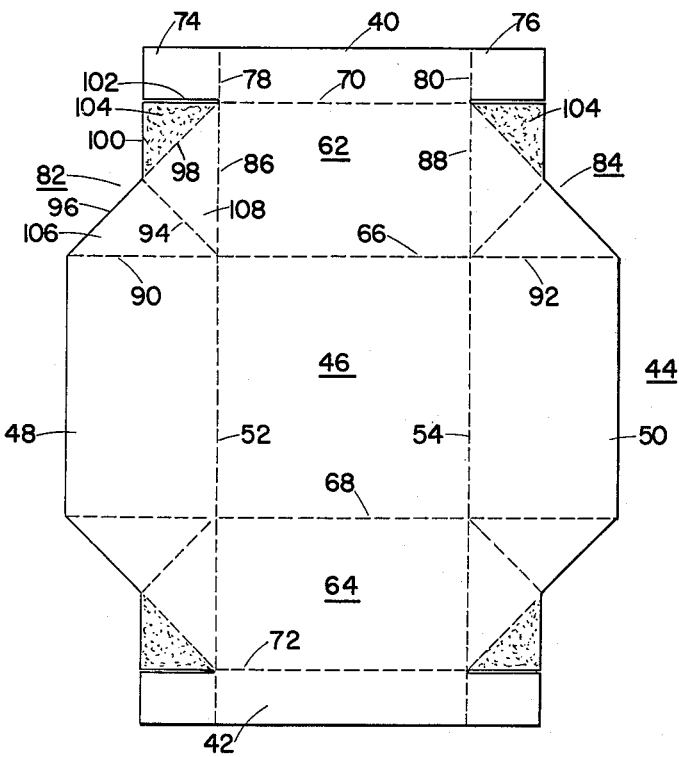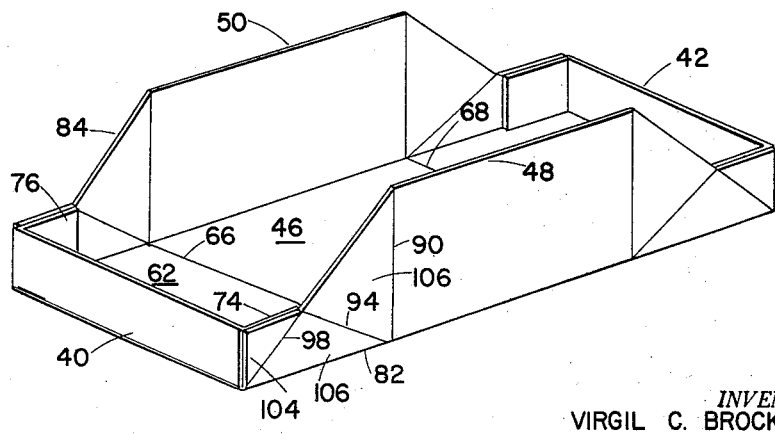

May 14, 1963  V. C. BROCKMANN  3,089,462
PACKAGE AND FEEDER FOR BIRD FEED
Filed Nov. 14, 1961  3 Sheets-Sheet 3
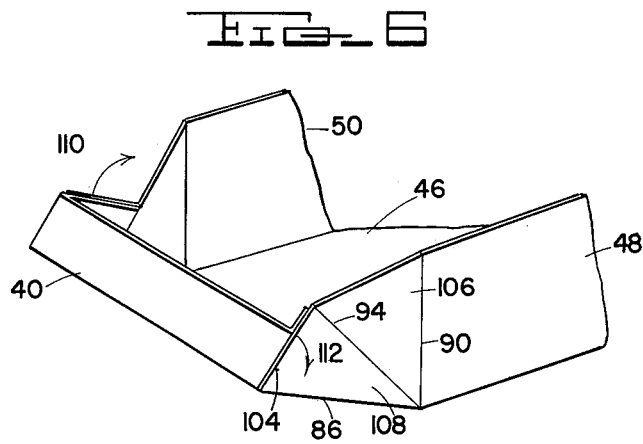
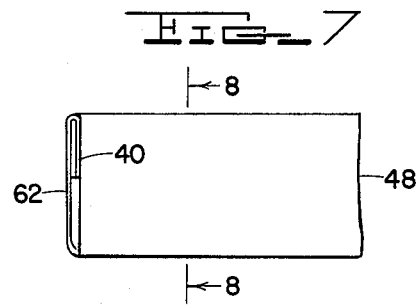
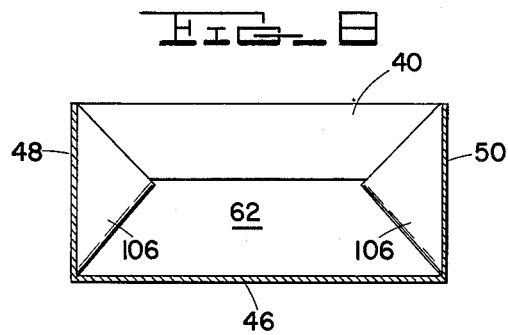
*INVENTOR.*
VIRGIL C. BROCKMANN
BY *Hood, Gust & Irish*
ATTORNEYS

United States Patent Office 3,089,462
Patented May 14, 1963

3,089,462
PACKAGE AND FEEDER FOR BIRD FEED
Virgil C. Brockmann, New Haven, Ind., assignor to Henderson-Reed Bros. Co., Inc., Fort Wayne, Ind., a corporation of Indiana
Filed Nov. 14, 1961, Ser. No. 152,351
2 Claims. (Cl. 119—52)

This invention relates to a package for bird feed and the like which is adaptable for use as a feeder.

In the past, bird feed has been packaged and merchandised in boxes or bags, the customer pouring the feed from the package in which it was sold into another device for feeding. Bird feeders have been commercially available, however, in the past when such devices were employed, it was necessary to purchase them separately from the feed; while many retail outlets such as supermarkets have sold bird feed, such outlets rarely have sold bird feeders.

It is an object of my invention to provide a package for shipping and merchandising bird feed and the like, which is adaptable for use as a feeder, thus eliminating the necessity for purchasing a separate feeding device. It is desirable that such a package lend itself to economical quantity production, be readily shipped and displayed on the retailer's shelving, and simply converted to a feeder by the customer.

Further objects and advantages of my invention will become apparent by reference to the following description and the accompanying drawing, and the features of novelty which characterize my invention will be pointed out with particularity in the claims annexed to and forming a part of this specification.

My invention, in its broader aspects, provides a package and feeder for bird feed and the like comprising a vertically elongated tubular hopper member for accommodating a quantity of feed and having closed upper and lower ends. A feeding member is provided on the hopper member adjacent the lower end, the feeding member being movable between first and second positions. The feeding member in its first position extends outwardly from the hopper member and has means defining a feeding trough, the hopper member having means formed therein communicating with the trough when the feeding member is in its first position for dispensing feed thereto. The feeding member in its second position covers the dispensing means and means are provided for retaining the feeding member in its second position during shipment, storage and display of the package.

In the drawing:

FIG. 1 is a view in perspective of the package and feeder of my invention as sold;

FIG. 2 is an exploded view in perspective showing the device of FIG. 1 during the course of conversion to a feeder;

FIG. 3 is a fragmentary view in perspective showing the package of FIG. 1 after conversion to a feeder;

FIG. 4 is a plan view of the blank from which the base of the package of FIG. 1 is formed;

FIG. 5 is a view in perspective showing the base of the package of my invention in its unfolded or feeding position;

FIG. 6 is a fragmentary view in perspective showing the base in the process of unfolding the same from the initial position to the feeding position;

FIG. 7 is a fragmentary side view of the base in the initial position; and

FIG. 8 is a cross-sectional view taken along the line 8—8 of FIG. 7.

Referring now to the figures of the drawing, my package and feeder, generally indicated at 10, comprises a vertically elongated tubular hopper member 12, a base member 14, and a sleeve member 16 which retains the base 14 in its closed position, i.e., the position during shipment, storage and display.

The hopper member 12 is rectangular in cross-section and is formed of suitable relatively thin self-supporting sheet material, such as relatively stiff cardboard. After assembly of the device and filling the hopper member 12 with a predetermined quantity of bird seed, the upper end 18 is closed in any suitable fashion, as at 20, and a suitable cord 22 is secured thereto for suspending the feeder. Hopper member 12 has an open lower end 24 which is closed by the base or feeding member 14 which is also preferably formed from a relatively thin sheet of self-supporting material, such as relatively stiff cardboard.

After conversion to a feeder, two opposite side walls 26 and 28 of hopper member 12 have apertures 30 formed therein adjacent the lower end 24; apertures 30 may be initially closed and adapted to be punched-out in accordance with conventional practice in the cardboard box art.

Base 14 is attached to the hopper member 12 and has two feeding portions 32 and 34. In the initial shipping, storing and display position, feeding portions 32 and 34 are folded so as to engage the opposite side walls 26, 28 of the feeding member 12 thus concealing the portions which are adapted to be punched-out to form the apertures 30, as shown in FIG. 2. Feeding portions 32, 34 are retained in their initial folding position for shipping, storage and display of the package by a sleeve member 16 which is slipped thereover, as shown in FIGS. 1 and 2. Sleeve member 16 may be formed of the same material as hopper member 12 and base 14, and may be retained in assembled position in any suitable manner, as by the use of pressure-sensitive tape. Sleeve member 16 may if desired be dispensed with and the feeding portions 32, 34 retained in their folded position, as shown in FIG. 2, by other means, such as by pressure-sensitive tape.

After removal of the sleeve member 16, feeding portions 32 and 34 of base 14 are adapted to be folded downwardly and outwardly, as will be hereinafter more fully described, to define troughs 36, 38 respectively. It will be observed that the apertures 30 communicate respectively with the troughs 36, 38 for dispensing feed thereto by gravity from the hopper member 12. It will further be observed that the end sections 40 and 42 of the feeding portions 32, 34 which respectively define troughs 36 and 38 provide convenient perches for birds while feeding from the troughs 36, 38.

Referring now in particular to FIGS. 4 through 8, inclusive, the base member 14 is formed from a blank 44 of suitable material having a central rectangular section 46 generally coextensive with hopper member 12 which abuts the bottom edge of the open end 24 and closes the same. Rectangular side sections 48 and 50 are joined to opposite sides of the center section 46 by fold lines or creases 52 and 54 respectively. Side sections 48 and 50 are folded to extend vertically upwardly from the center section 46 and respectively engage the opposite side walls 56 and 58 of the hopper member 12, being secured thereto in any suitable manner, as by staples 60.

Rectangular bottom sections 62 and 64 of the feeding portions 32, 34 are respectively joined to the other two opposite sides of the center section 46 by fold lines 66 and 68. End sections 40 and 42 are respectively joined to the bottom sections 62, 64 by fold lines 70 and 72. The end sections 40, 42 respectievly have glueing tabs 74, 76 joined to their sides by fold lines 78, 80. Sections 82 and 84 are respectively joined to bottom section 62 by fold lines 86 and 88 and to side sections 48, 50 by fold lines 90 and 92. Identical sections respectively join the other bottom section 64 to the other ends of the side sections 48, 50, as seen in FIG. 4. Section 82 has a first triangular portion 106 defined by fold lines 90 and 94 and edge 96, a second triangular section 108 defined by fold lines 86, 94 and 98, and a third triangular section 104 defined by fold line 98 and edges 100 and 102. Section 84 is formed identically to section 82 as are the corresponding sections at the other end of blank 44.

When assembled, the triangular section 104 of each of the sections 82, 84 is coated with a suitable adhesive, glue tabs 74, 76 of the end sections 40 and 42 are respectively folded along fold lines 78, 80 and the end sections 40 and 42 are respectively folded along fold lines 70, 72, the glue tabs 74 and 76 being adhered to the adhesive on the triangular sections 104, as seen in FIG. 5. The resulting unfolded structure shown in FIG. 5 is assembled on the open lower end 24 of the hopper member 12 by securing side sections 48, 50 to the opposite side walls 56, 58 respectively of the hopper member 12 in any suitable manner, as by staples 60.

The feeding portions 32, 34 of base 14 are folded into their closed position, as shown in FIG. 2, in the manner shown in FIGS. 6, 7 and 8. Here, the triangular sections 106 and 108 of the sections 82, 84 are respectively folded inwardly upon themselves along fold lines 86, 90 and 94 (in the case of section 82) as shown by the arrow 110, which in turn causes the triangular sections 104 to hold outwardly and downwardly onto triangular sections 108, as shown by arrow 112. This results, when the structure is completely folded, in an arrangement as shown in FIGS. 7 and 8 in which end sections 40, 42 with their respective glue tabs 74, 76 and the triangular sections 104 to which they are adhered being accommodated in the fold between the triangular sections 106 and 108, as best seen in FIG. 8. Unfolding of the feeding portions 32, 34 to the feeding position, as shown at FIGS. 3 and 5, is in the inverse sequence.

While my invention has been described and illustrated in connection with a package and feeder for bird feed, it will be readily apparent that the construction is equally applicable to other uses, such as a package and feder for rodent bait.

It will now be seen that I have provided a package for shipping, storing and merchandising bird feed and the like which is readily convertible by the purchaser to a feeder.

While I have illustrated and described a specific embodiment of my invention, further modifications and improvements will occur to those skilled in the art and I desire therefore in the appended claims to cover all modifications which do not depart from the spirit and scope of my invention.

What is claimed is:

1. A package and feeder for bird feed and the like comprising: a vertically elongated hopper member having a rectangular cross-section and formed of relatively thin self-supporting sheet material for accommodating a quantity of feed, said hopper member having an open lower end, two opposite side walls of said hopper member having means respectively formed therein adjacent said lower end for dispensing feed therefrom; and an integral closure and feeding member formed of relatively thin self-supporting sheet material, said feeding member having a first rectangular portion generally coextensive with said lower end of said hopper member extending across said lower end and closing the same, said first portion having two upstanding rectangular sections respectively joined to a first two opposite sides thereof, said upstanding sections respectively engaging the outer surfaces of the other two opposite side walls of said hopper member and being secured thereto, said feeding member having two rectangular second portions, each of said second portions having one of a first two opposite sides joined to a respective one of the other two opposite sides of said first portion and foldable upwardly thereabout, each of said second portions having a rectangular end section joined to the other of said first two opposite sides thereof and foldable upwardly thereabout, each of said second portions having side sections respectively joined to the other two opposite sides thereof and foldable upwardly thereabout, the side sections of each of said second portions being respectively joined to opposite sides of the respective end sections and being foldable inwardly thereabout, the side sections of each of said second portions being respectively joined to respective sides of said upstanding sections of said first portion and foldable inwardly thereabout, the side sections of each of said second portions having folding creases formed therein whereby said second portions may be folded upwardly into first positions with the respective end sections and portions of the side sections folded into flat engagement with the outer surfaces of the respective said first two opposite side walls of said hopper member, and downwardly into second positions extending outwardly from said first portion with said side and end sections respectively upstanding to define feeding troughs having said dispensing means respectively communicating therewith.

2. The combination of claim 1 further comprising a sleeve member of a rectangular cross-section formed of relatively thin self-supporting sheet material, said sleeve member being removably positioned over said feeding member when said second portions are in said first position thereof and engaging the same.

References Cited in the file of this patent

UNITED STATES PATENTS

| | | |
|---|---|---|
| 2,235,959 | Copeman | Mar. 25, 1941 |
| 2,556,707 | Rendall et al. | June 12, 1951 |
| 2,775,226 | Early | Dec. 25, 1956 |
| 2,787,248 | Brendle | Apr. 2, 1959 |
| 2,891,711 | Early | June 23, 1959 |